Figures 1, 2:
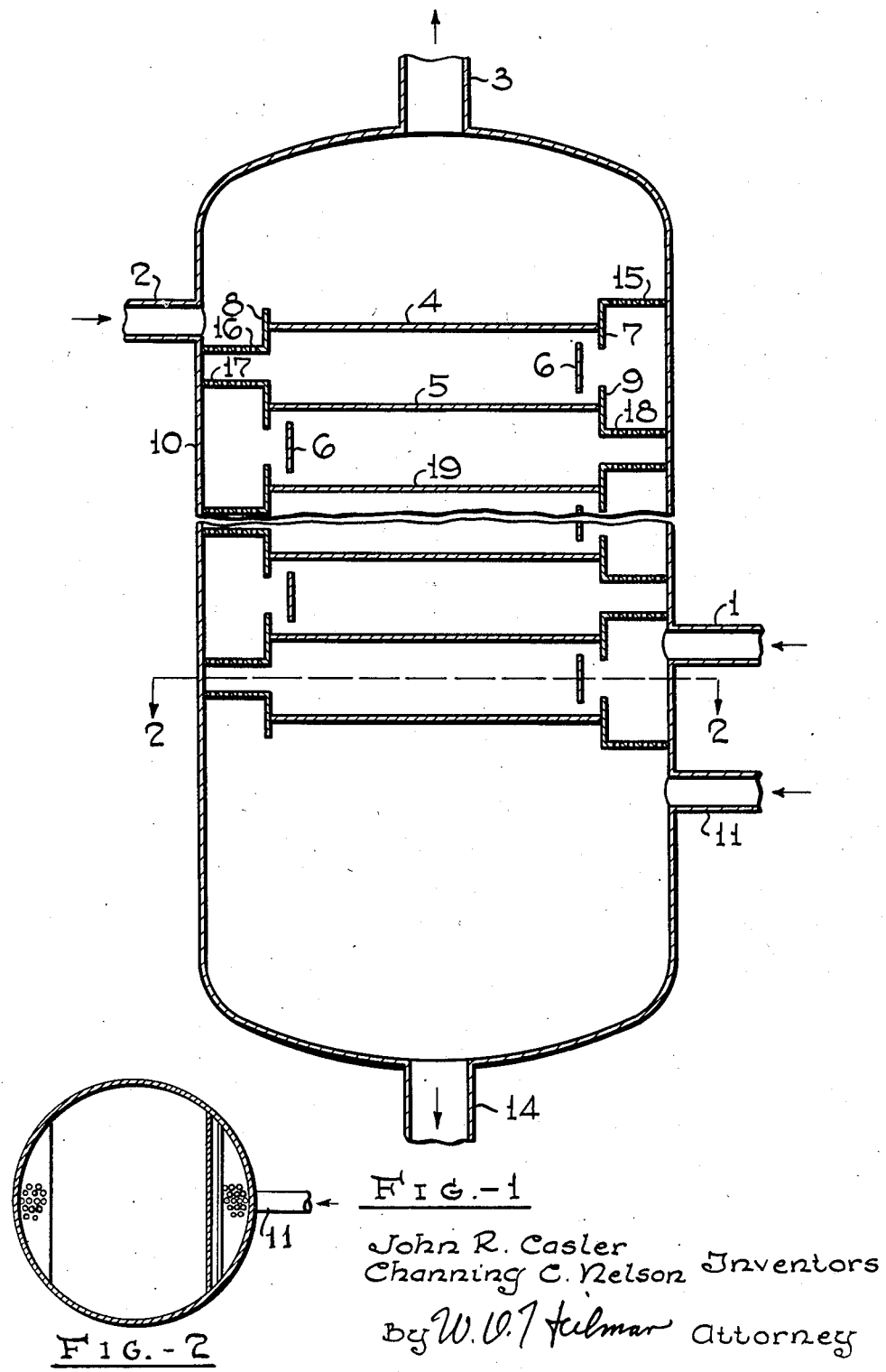

Sept. 2, 1952  J. R. CASLER ET AL  2,609,276
LIQUID-LIQUID EXTRACTION PROCESS AND TOWER
Filed Sept. 24, 1948

John R. Casler
Channing C. Nelson  Inventors
By W. W. J. Fulmar  Attorney

Patented Sept. 2, 1952

2,609,276

UNITED STATES PATENT OFFICE 2,609,276

LIQUID-LIQUID EXTRACTION PROCESS AND TOWER

John R. Casler, Elizabeth, and Channing C. Nelson, Cranford, N. J., assignors to Standard Oil Development Company, a corporation of Delaware Application September 24, 1948, Serial No. 51,048

3 Claims. (Cl. 23—310)

The present invention relates to an improved process and apparatus for the contacting of two normally immiscible, or partly miscible liquids. The invention is adapted for the contacting of liquids in any liquid-liquid system. In accordance with the present invention a novel perforated plate construction is employed in a vertical tower characterized by providing countercurrent mixing and concurrent settling in each pair of plates throughout the tower.

The invention is directed broadly to processes in which liquids are treated by selective solvent action. At the present time there are a great many chemical processes in which a selective solvent is used to treat a particular liquid in order to secure a partial segregation, or removal of chemical constituents of the liquid. For example, petroleum oils are conventionally treated with solvents such as liquid sulfur dioxide, phenol, creosote, nitrobenzene, furfural, analine, ether and other solvents or mixture of such solvents. Use of these solvents with petroleum oils is particularly employed to remove low viscosity index constituents of the oil to obtain a treated oil having an improved viscosity index. More generally, such solvent treating processes are employed to selectively remove undesired constituents from the liquid being treated with the solvent or in some cases to recover desired constituents.

In solvent treating operations of the general character above described, many modifications are used to control the solvent extraction process as desired, for example, auxiliary solvents, or modifying agents may be injected into the treating system. Again a wide range of temperature and pressure conditions may be employed in particular types of solvent extractions. The present invention is not concerned with the modifications or refinements of solvent treating processes. However, the invention is concerned with the basic method and apparatus used for contacting liquids whatever the particular system may be. It is, therefore, to be understood that this invention is of application to any liquid-liquid contacting system with any of the modifications which may be employed in such processes.

Many methods have been devised for the contacting of liquids. However, it has been found more advantageous to effect large volume interfluid treating in contacting towers rather than in mixers and settlers, centrifuges, etc. Processing in towers is more advantageous from the economic viewpoint because of the lower initial and operating costs. Consequently, considerable attention has been given to the apparatus required for efficient liquid-liquid contacting in towers. The towers which have been employed have been of a wide variety of types some employing various types of packing materials, others employing bubble cap plates and others employing a wide variety of internal baffles. However, of the various types of fluid contacting towers developed, those involving the use of pierced plates have proved to be particularly advantageous in the processing of large quantities of liquids.

Conventional pierced plate towers consist of a large number of horizontally disposed perforated plates extending throughout the tower. The plate perforations provide orifices through which at least one of the liquids may be dispersed. Heretofore, the pierced plates known to the art have been characterized by plate efficiencies not substantially greater than about 50%. By plate efficiency as that term is used, it is meant that each plate is effective in accomplishing a percentage contacting efficiency of the contact achieved at equilibrium in a single batch stage mixer and settler. Thus one theoretical stage is established by contacting two liquids intimately in a batch mixer followed by a thorough settling in a batch settler. As stated, therefore, conventional pierced plate liquid contacting towers, due to their plate efficiency of about 50% substantially require a number of plates exceeding by a factor of two the number of theoretical stages of contacting required. It is clearly of the greatest importance to improve the plate efficiency of the types of pierced plates used in such towers in order to decrease the expense of the contacting and to decrease the size of the towers necessary. It is, therefore, the principal object of this invention to provide an improved type of pierced plate extraction tower in which the plate efficiencies are substantially above 50%.

In analyzing the necessary mechanism required in liquid-liquid contacting it is apparent that two basic effects are required. These are efficient mixing of the liquids followed by efficient separation of the mixed liquids. Thus in extraction towers having a given number of plates for best efficiency it is necessary that each plate, or set of plates provide good mixing and provide good settling. Only by achieving both of these desiderata in such a tower is it possible to secure many theoretical stages. Conversely considering any one extraction plate, such a plate can only have a high plate efficiency if the plate is capable of both thoroughly mixing and thoroughly separating the mixed liquids. It is, therefore, a further and more particular object of this invention to provide a type of pierced plate which will most effectively be capable of thoroughly mixing and thoroughly settling liquid phases passing through the plate.

In developing a particular pierced plate design for contacting a given liquid-liquid system, it is necessary to secure certain basic data as to the mixing and settling characteristics of the liquids concerned. For example, certain liquids may be very readily mixed, but when mixed are difficult to separate. Alternatively, other types of liquids are difficult to mix but may be readily separated. As a result of this factor extraction towers known to the prior art have been of different types depending upon the particular liquid-liquid system to be contacted. One of the objects of this invention is to provide an extraction tower which may be readily designed for any liquid-liquid system to provide the necessary mixing and settling to meet the particular characteristics of the liquids to be treated. Thus the extraction tower of the present invention is adapted to the contacting of two liquids which are easy to mix but hard to separate, such as phenol and oil, or to the contacting of two liquids which are difficult to mix but easy to separate such as caustic solutions and oil.

In accordance with these objectives of the present invention, a novel pierced plate design has been developed which provides an intimate counter-current mixing of the liquids to be contacted in a confined portion of the plate, and which provides an enlarged section of the plate through which the mixed liquids may concurrently flow to attain efficient separation of the mixed liquids prior to re-mixing in subsequent plates. The mixing and settling zones provided in these plates may be altered by the particular design of the plate to secure the required amount of mixing and settling for any liquid-liquid system. The nature of this invention may be fully understood from a consideration of the accompanying drawings as referred to in the following description. In these drawings Fig. 1 illustrates a complete extraction tower embodying the novel pierced plates of this invention, and Fig. 2 illustrates a cross sectional view of the tower through the line 2—2 of Fig. 1.

Referring to Fig. 1, particularly as clarified by reference to Fig. 2, it is assumed that a liquid such as petroleum oil is to be treated with a solvent such as phenol. The phenol may be introduced into the top of the extraction tower 10 by means of line 2 while the oil to be treated may be introduced at the bottom of the tower by means of line 11. The oil which has been solvent treated will then be removed from the top of the tower through line 3, while the spent phenol will be removed from the bottom of the tower through line 14. Horizontally disposed throughout the vertical length of the tower are a plurality of pierced plates indicated by the numerals 4, 5, 9, etc. Each of the plates is composed of three sections maintained in step-wise relationship. Thus the uppermost plate 4 has an upper step 15 and a lower step 16. Again plate 5 has an upper step 17 and a lower step 18. Both the upper and lower steps of each plate are perforated by a plurality of holes, or if desired by suitable slots or other types of perforations. Each plate, aside from the perforated upper and lower steps of the plate are solid, being impervious to liquids. At the joinder of each of the upper and lower steps of the plates, the steps are caused to extend beyond the main portion of the plate to provide a projection which as will be seen serves as a weir. Thus the upper step 15 of plate 4 where it joins the main portion of plate 4 extends below the plate to provide a weir 7. Similarly the portion of the lower step 16 where it joins the main portion of the plate 4 extends above the plate to provide the weir 8. It will be observed that each plate is of the same construction, but that successive plates are in reversed relation with each other. Thus the lowermost step of plate 4 is closely adjacent to the uppermost step of plate 5, while the lowermost step of plate 5 is closely adjacent the uppermost step of plate 9, etc., throughout the tower. By this means a comparatively small confined zone is provided between successive plates such as the zone between the steps 16 and 17 of plates 4 and 5. Furthermore, by means of this construction a comparatively large zone is provided in the central part of the tower between the main portions of successive plates. Furthermore, an even greater vertical separation of plates exists in the remaining portion of the tower as between the steps 15 and 18 of the plates 4 and 5. As will be seen this construction provides a confined zone for intimately mixing the fluids, a large zone for enabling efficient separating of the mixed fluids, and a collecting or pressure developing zone wherein liquids may accumulate to provide sufficient head or pressure to pass on to the next successive mixing zone.

In considering the manner in which the apparatus illustrated in the drawings operates, as stated, it is assumed that the liquids to be contacted are phenol and oil. Phenol being introduced to the top of the tower and being of a greater density than oil which tends to flow downwardly through the tower countercurrent to the flow of oil introduced at the bottom of the tower. A layer, or head of phenol will build up on each of the lowermost steps of the individual plates, for example, on the portions of plates 4 and 5 indicated by numerals 16 and 18. Similarly a layer or head of oil will build up beneath the uppermost step of each of the plates as for example below the portions of plates 4 and 5 indicated by numerals 15 and 17. Depending upon the operating conditions of the tower, and the perforations provided, the interface between the layers of phenol and oil will extend more or less towards the weirs bounding the indicated portions of the plates. In this manner sufficient pressure will be provided so that the phenol and oil will be jetted through the perforations countercurrently to each other. Thus phenol will be jetted downwardly through the perforations of step 16, while oil will be jetted upwardly through the perforations of step 17. The counter-currently moving phenol and oil will be intimately mixed in the comparatively confined space between these two steps. The mixed oil and phenol, in the form of an unstable emulsion will then flow inwardly toward the center of the tower into the enlarged settling zone provided. Due to the enlargement of the central zone of the tower, the flow of the liquids in this portion of the tower will be comparatively slow. Furthermore, both the phenol and the oil will be flowing in the same general direction; that is, toward the opposite side of the tower away from the mixing zone. Consequently, the phenol and oil is enabled to efficiently separate in the central part of the tower. Oil will tend to separate and to collect on the underside of plate 4, while phenol will tend to separate and collect on the upper-side of plate 5. Separated oil will then flow over the weir 7 to collect beneath the perforations in the step 15 and to pass upwardly through the perforations. Similarly phenol will overflow the weir 9 to flow downwardly to and through the perforations in the step 18. By positioning vertical baffles such as indicated by numeral 6, adjacent to weirs 7 and 9, substantially no mixed phenol and oil is permitted to pass on to subsequent mixing zones. As described, therefore, the apparatus illustrated functions by maintaining a countercurrent jetting of the liquids in a confined portion of adjacent plates followed by concurrent flow of the liquids in an enlarged settling zone followed by an overflow of the separated liquids into successive mixing zones of further plates.

It should be appreciated in considering the embodiment of the invention illustrated that utilization of the vertical weirs, such as the weirs 7, 8 and 9, is optional since the plates operate substantially as described without the utilization of these weirs. Similarly the vertical baffles 6 may or may not be employed. While it is preferred to employ the weirs and baffles as illustrated and described, the plates of this invention do not depend solely upon these weirs and baffles for efficient operation.

It is apparent that by adjusting the perforations of the mixing zone and by changing the positioning of the adjacent steps of the plates providing the mixing zones, the degree of mixing attained may be adjusted to provide any desired degree of mixing. It is further apparent that by adjusting the vertical separation of successive plates, it is possible to enlarge, or decrease the settling zone provided so as to attain the desired degree of settling for a particular liquid system. It is, therefore, to be understood that the invention is not limited to any particular dimensions, or relations of step size. However, for the purposes of clarity an embodiment of this invention particularly adaptable to the treating of phenol and oil will be given indicating the requisite perforations and dimensions. In such an embodiment of the invention the tower 10 may have a diameter of about twelve feet. The vertical height of the tower may be chosen to provide any desired number of stages. The settling zone provided between the uppermost and lowermost steps of each plate may extend horizontally for about nine feet. The steps of the plates providing the perforations for the mixing zones may extend horizontally about one and one-half feet. The main portion of each plate may be separated vertically by about two feet, while each step above and below the main portion of the plate may be about eight and one-half inches above or below the main portion of the plate. The weirs may extend about four inches vertically above or below the main portion of the plate. The vertical baffles may be positioned from the weirs by about six inches and may comprise a vertical height of about fifteen inches. It is convenient to drill a large number of small holes in the uppermost and lowermost steps of each plate to provide the orifices through which the liquids are jetted. These holes may be of about one-fourth inches in diameter, although the diameter of the holes is not particularly critical. The holes through which the phenol is to be jetted into the mixing zones may comprise about 3,350 quarter inch holes, while the holes through which the oil is to be jetted into the mixing zone may comprise about 2,420 quarter inch holes. Preferably none of the holes are placed within two inches of the tower shell.

Employing a test plate having dimensions proportional to those indicated above, several test runs were made in which a lubricating oil was treated with phenol. The fresh lube oil being treated had an A. P. I. gravity of about 24° and a viscosity of about 3.1 centistokes at 210° F. The viscosity index of the oil entering the plate was about 82.0. Four runs were made, employing an oil feed rate of 3.6, 5.1, 6.4 and 6.9 gallons of oil per minute, while respectively employing phenol feed rates of 3.9, 5.8, 7.3, and 7.7 gallons of phenol per minute, providing a phenol treat of 108%, 113%, 114%, and 112%. In each of the four runs conducted under these conditions the degree of mixing attained on the test plate was excellent; the oil and phenol being intimately mixed as adduced by the fine particle size achieved and visually observed through transparent ports. The degree of settling attained on the plate was also very good as substantially no phenol was entrained in the raffinate and substantially no oil was entrained in spent phenol. During these tests the head of phenol above the perforated steps varied from 2.2 to 5.0 inches, while the head of oil under the perforations was about 6.0 inches. The viscosity index of the oil leaving the plate was about 90.0. As compared to this the viscosity index obtainable in a laboratory batch mixing and settling apparatus was 89.6. Commercial scale phenol treating towers showed essentially the same efficiency. It is, therefore, to be seen that an extremely high plate efficiency is obtainable employing the extraction plate of this invention.

As described, therefore, the novel extraction plate of this invention comprises a stepwise plate providing a confined countercurrent mixing zone between pairs of plates and providing an enlarged concurrent settling case adjacent the mixing zone. The perforated area of the plate amounts to about 5–50% of the total area of the plate. The upper step of each plate is approximately 0–24 inches above the intermediate step of the plate, while the lowermost step of each plate is about 24–0 inches below the intermediate part of the plate. The intermediate portions of successive plates is preferably positioned about 18–30 inches apart. The diameter of the plates, and the number of plates employed may be chosen at will, depending upon the volume and extent of the treat required.

What is claimed is:

1. An improved liquid-liquid solvent extraction process for countercurrently contacting two liquids having partial immiscibility with respect to one another and of different densities which comprises maintaining a plurality of treating zones one above the other, flowing the respective liquid streams in an initial stage of each zone in a plurality of high velocity jets directly opposed to each other, thereafter passing the streams in concurrent relation at low velocity through an unobstructed secondary stage in a flow direction substantially perpendicular to the flow in said initial stage whereby separation of the two streams occurs, and passing said separated streams from said second stage into a tertiary stage and flowing the respective streams in said tertiary stage substantially perpendicular to the flow of streams in said secondary stage, maintaining the volume of liquids in said tertiary stage sufficient to create a sufficient head to force the respective streams into initial stages of adjacent zones.

2. A contacting plate having a substantially circular circumference and characterized by five plane surfaces arranged in substantially horizontal and vertical planes to form three steps consisting of a lowermost step at one side of the plate, an intermediate level step at the central portion of the plate, and an uppermost step at the opposite side of the plate, the horizontal plane surfaces of said lowermost and uppermost steps being at least partially perforated.

3. The plate defined by claim 2 in which the vertical plane surface between the lowermost and intermediate steps extends above the level of the intermediate step and in which the vertical plane surface between the uppermost and intermediate steps extends below the level of the intermediate step forming weirs above and below said intermediate step.

JOHN R. CASLER.
CHANNING C. NELSON.

REFERENCES CITED

The following references are of record in the file of this patent:

UNITED STATES PATENTS

| Number | Name | Date |
| --- | --- | --- |
| 1,782,735 | MacKensie | Nov. 25, 1930 |
| 2,088,497 | Tijmastra | July 27, 1937 |
| 2,154,144 | Albin | Apr. 11, 1939 |
| 2,176,806 | Schuessler | Oct. 17, 1939 |
| 2,271,462 | Pfennig | Jan. 27, 1942 |
| 2,274,030 | Atkins | Feb. 24, 1942 |
| 2,400,378 | Stines | May 14, 1946 |
| 2,460,019 | Long et al. | Jan. 25, 1949 |

FOREIGN PATENTS

| Number | Country | Date |
| --- | --- | --- |
| 685,734 | France | July 16, 1930 |